2 Sheets
Sheet 1
J. J. Weeks.
Mower.
No 1747
Reissued Aug. 23, 1864.
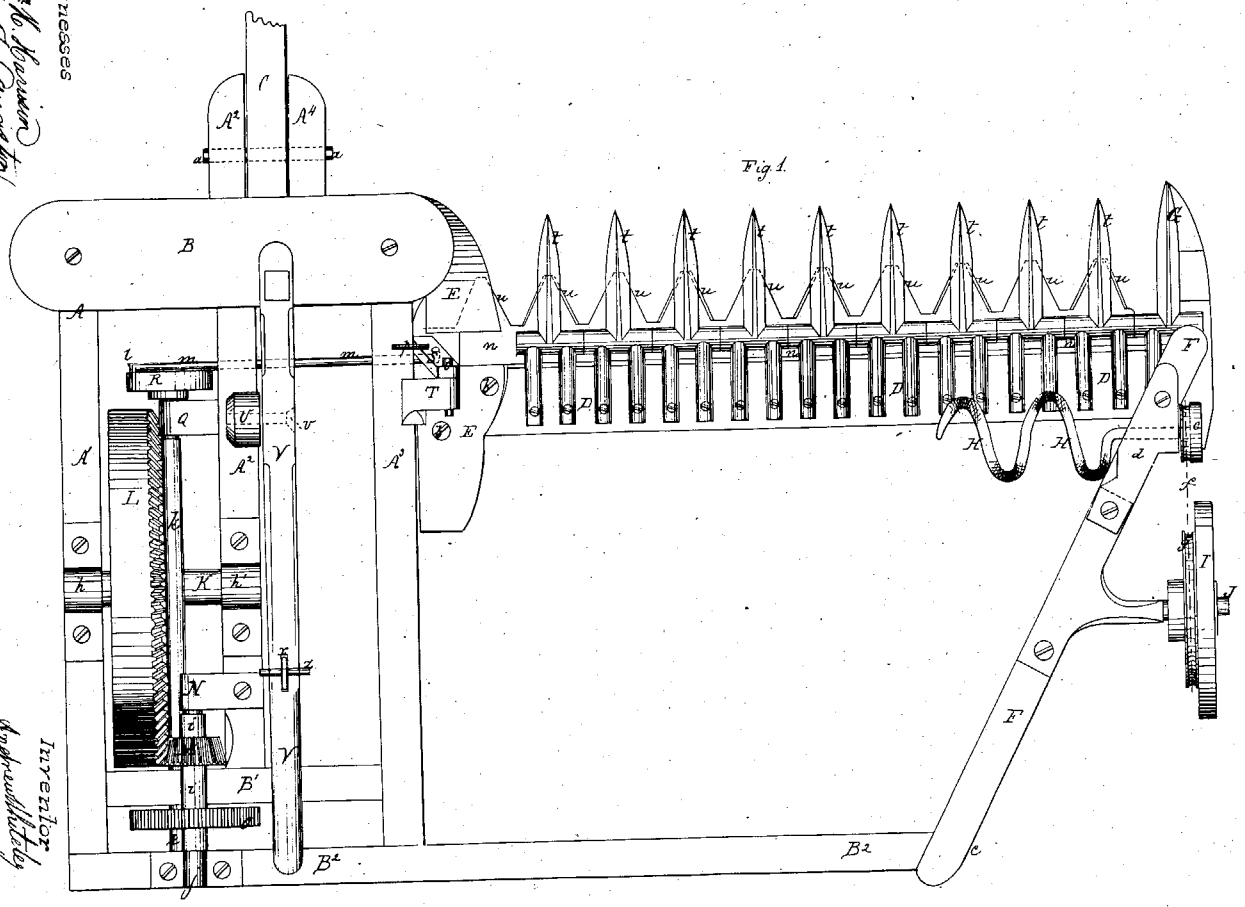
Witnesses
Wm. H. Harrison
A. T. Langston
Inventor
Andrew White Ley 2 Sheets
Sheet 2
J. J. Weeks.
Mower.
№ 1747 Reissued Aug. 23, 1864.
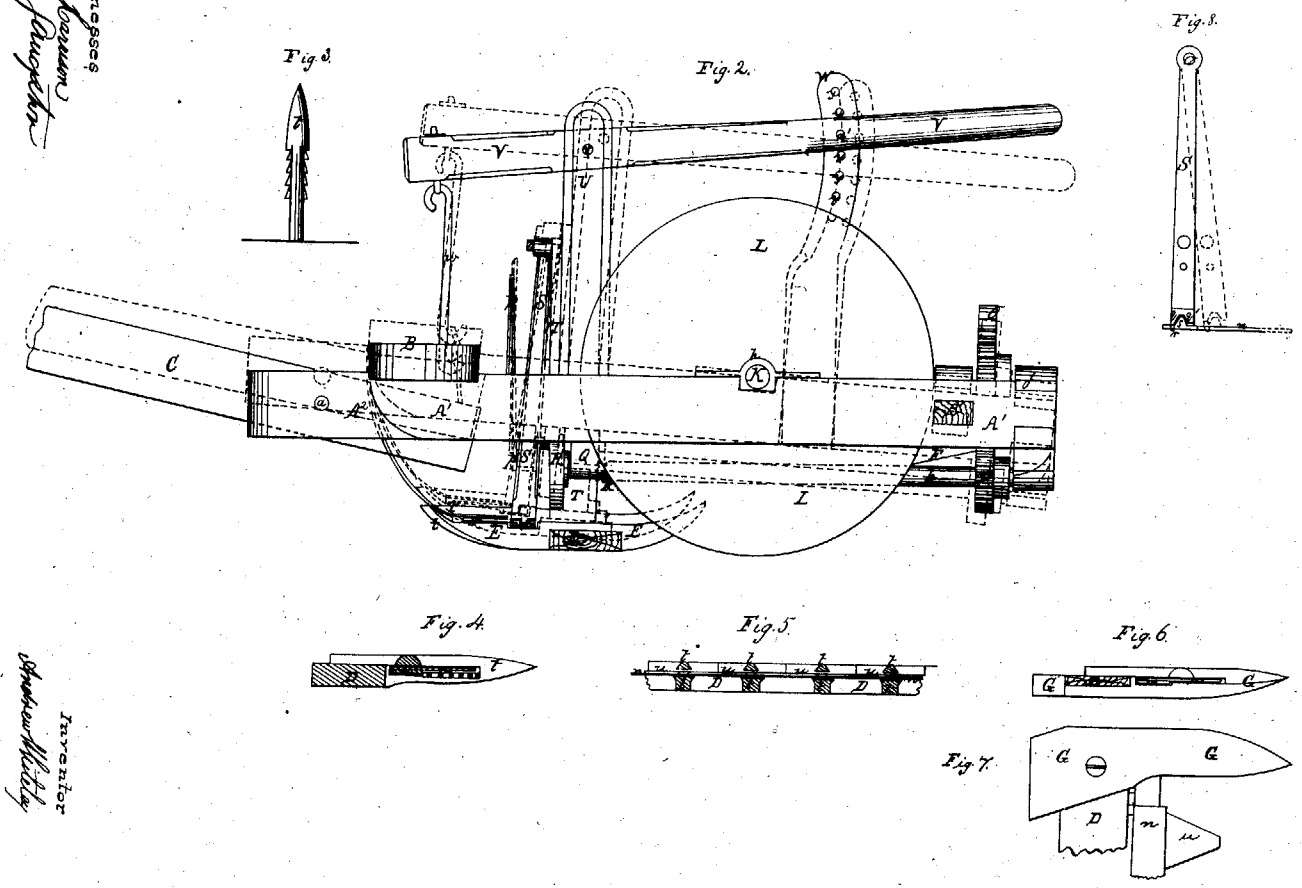
Witnesses
Wm. H. Larrison
A. T. Faugeter
Inventor
Andrew Whitley

UNITED STATES PATENT OFFICE.

ANDREW WHITELEY, OF SPRINGFIELD, OHIO, ASSIGNEE, BY MESNE ASSIGNMENTS, OF JOHN J. WEEKS.

IMPROVEMENT IN HARVESTERS.

Specification forming part of Letters Patent No. 11,735, dated September 26, 1854; Reissue No. 1,747, dated August 23, 1864.

*To all whom it may concern:*

Be it known that JOHN J. WEEKS, of Oyster Bay, in the county of Queens and State of New York, invented certain new and useful Improvements in Reaping and Mowing Machines, of which the following is a full, clear, and exact description, reference being had to the accompanying drawings and the letters of reference marked thereon, in which—

Figure 1 is a plan or top view of his improved machine. Fig. 2 is a side elevation of the same, showing in red lines the action of the lever, &c. Fig. 3 is an under view of one of the fingers. Fig. 4 is a side view of one of the fingers, the cutter-bar being cut transversely. Fig. 5 is a front view of four fingers and a portion of the cutter-bar, the ends of the fingers being removed. Fig. 6 is a side view of the divider and end view of the cutter-bar and outer end cutter. Fig. 7 is an under side view of the same, the cutter-bar and cutter being in its inner reciprocation. Fig. 8 is a detail showing the movement of the pendulum.

The nature of that part of the invention herein claimed will best be understood from the following description and explanations:

That side of the machine which is at the left hand when behind and facing it I call the "inner" side, and that at the right the "outer" side.

The main part of the frame A, to which the other parts of the machine are secured, is formed by placing three beams, A′, $A^2$, and $A^3$, parallel with each other and with the path they are to move in, and at right angles thereto three cross-beams, B, B′, and $B^2$, which are confined together by mortises and tenons and by screw-bolts, as follows: by making a mortise in A′ and $A^3$, near their rear ends, and a tenon on each end of B′, and inserting the tenons into the mortises; by making a mortise in B′ and a tenon on the rear end of $A^2$, and inserting the tenon into the mortise; by embedding the size of A′, $A^2$, and $A^3$ into the under side of B (which is made wide for that purpose) a sufficient distance to hold the parts in the same relative position when confined by screw-bolts, and also in the same manner a short beam, $A^4$, between which and $A^2$ the rear end of the tongue C vibrates upon a horizontal fulcrum-pin, *a*, which is in front of and above the fingers, as seen in Fig. 2 of the drawings; by making tenons on the rear ends of A′ and $A^3$, a slot in the inner end of $B^2$, into which the tenon on A′ is inserted, and a mortise in $B^2$ into which the tenon of $A^3$ is inserted. The inner end of the finger-bar D is placed in the bed formed in the under side of the shoe E, and there confined by the screw-bolts *b b*. The beam $B^2$ is extended out from the main part of the frame, as shown in Fig. 1 of the drawings, and has connected to it by a mortise and tenon and joint-bolt *c* the rear end of beam F, which runs angling inward and upward from the outer end of the finger-bar, to which it is attached by a screw-bolt, which is run up through the divider G, the finger-bar D, and into or through the front end of said beam F.

To the upper side of beam F, a short distance in rear of the finger-bar, is secured by screw-bolts (which enables it to be readily removed) the box *d*, in which the journal of the track-clearer H is made to revolve by placing upon its outer end the band-wheel *e*, which is driven by the band *f*, which is put in motion by the band-wheel *g*, and backward by crossing the band *f*.

I is the grain-wheel, whose axle J is about in the same vertical plane with the axle K of the cutter's driving-wheel L, which revolves in the boxes *h* and *h′*, and has cogs on its outer side, which mesh into a bevel-pinion, M, on and near the front end of a shaft, *i*, which is sustained by and revolves in the projecting end of N.

On and near the rear end of shaft *i*, which is sustained in the box J, is secured the spur-driver O, which meshes into and drives the pinion P on and near the rear end of the crank-shaft *k*, which revolves in a box, (seen at Fig. 2,) and has its front end sustained by and revolves in the downward-projecting end of Q, which is secured to the under side of $A^2$. On the front end of *k* is secured a fly-wheel, R, into which is inserted a wrist-pin, *l*, to which is confined in the proper manner the inner end of the cutter's driving-pitman *m*. The outer end of said pitman has its connection with the cutter-bar *n*, through the medium of a pendulum S, as seen in Fig. 2 of the drawings, which has its upper end hinged at *o* to the upper end of a post, T, which is secured to $A^3$, and has upon its lower end the shoe E. The outer end of the pitman *m*, it will be observed, is prevented from coming out of the the pendulum S, into which it is hooked, by the post T. The pendulum S is prevented from swaying from the post T, so as to let the outer end of the pitman work out of it by the coiled spring *p*, which has its upper end inserted into the beam $A^3$ and its lower end into the pendulum S. The lower end of the pendulum S is made forked, so as to form two cogs, *q* and *q'*, and below *q*, a holding-pin, *r*, which works in a small slot in the cutter-bar and prevents the cogs on the pendulum from slipping off of the cogs on the upper side of the cutter-bar, when not otherwise prevented from so doing. By having the pendulum thus connected to the cutter-bar the cutter-bar is reciprocated across and through the slots of the shoe, fingers, and divider, in straight lines, as a rack is moved by a vibrating pinion.

By having the shoe E constructed and connected to the frame A in the manner shown by Figs. 1 and 2 of the drawings it will be observed that the shoe not only sustains the end of the finger-bar at such a distance below the frame as to have the necessary open space between itself, the frame, and the vertical plane in which the cutters' driving-wheel moves for the cut grass, &c., to lie in without being dragged forward, and guides the inner end of the cutter-bar *n* across the fingers and divider in straight lines, but also is extended forward and upward in such a direction until connected to the frame as to slide freely over the cut grass when lying in its road without dragging it, and backward and upward from the bottom of the finger-bar, so as to be slid backward with ease and without dragging the grass.

*t t t t t t t t* are the fingers, with horizontal slots in them corresponding with that in the shoe and with that in the divider G, as seen in Figs. 4 and 6 of the drawings, which also show their upper and lower parts the proper distance apart to have each of the upper parts of the rear ends of the fingers rest upon the upper side of the finger-bar when the lower part of the finger is driven into a horizontal hole in the finger-bar, to which said upper parts each is secured by a screw, as shown in Fig. 1 of the drawings, which also shows the braces over the cutter-bar extending out from each side of the upper part of the fingers until they meet centrally between them.

By constructing and connecting the fingers to the finger-bar as shown it will be observed that there is no screw or bolt passed through the lower part of the finger, which weakens it and makes it troublesome to remove when broken or worn out, and which it is always troublesome to do, as it is not easy to know where to make a hole in the finger-bar which will exactly agree, as it should, with that in the finger. It will be observed that the width of bearing which said upper parts of the fingers have on the finger-bar holds the fingers much more firmly than when having no greater width of bearing on the bar than the size of the part which passes through the finger-bar, and also that the braces coming together in front of the finger-bar adds greatly to the strength of the fingers. The lower part of each finger has notches in its edges, as seen in Fig. 3 of the drawings, for preventing the standing crop from being crowded forward by the angle of the cutters' edges to the fingers' edges.

*u u u u u u u u u* are the several sections or cutters of which the cutter is formed, the same in number as the fingers *t* and divider G, and the same distance between centers, when on the cutter-bar *n*, as the points of the fingers are distant from each other, and when together on the bar *n*, whose outer end terminates with the outer end of the outer end cutter, forms what I term a "short" cutter, the outer end of which cutter is about midway between the inner edge of those parts of the divider against which the crop is cut and the same parts of the outer edge of the finger next to the divider when in its inner reciprocation, as seen in Figs. 1 and 6 of the drawings. The edges of each alternate and odd number of the sections of the cutter, as will be observed at Fig. 1 of the drawings, are at the under side, while the edges of the others and even numbers are at the upper side, so that both the upper as well as the lower parts of the fingers will each have an edge of the cutter shearing against and cutting the gum and other clogging matter away from them, which, if not cut away, would impede the free play of the cutter and greatly injure the value of the machine. The edges of the cutter, it will be observed, are so formed by having them some distance apart at their extreme rear as to be ground at the rear while on the bar, although the adjoining edges are one up and the other down.

By having that portion of the divider G against which the crop is cut and in front thereof of a less width than the distance which the cutter is reciprocated the divider is drawn into the standing crop with less power applied than it can be when it is as wide or wider than the distance which the cutter is reciprocated. Said divider also presses the standing crop down less than a wider divider, and thereby causes that part of the crop cut against it to be cut more nearly of the same distance from the ground of that cut against one of the fingers than it can be when the divider is as wide as the distance which the cutter is reciprocated, and thus I term said divider a "narrow" one; but it requires to be of about a certain width in order to possess the greatest advantages, as it is necessary to have the outer edge of the outer cutter properly protected when in its outer reciprocation. By having said narrow divider of a greater width where the outer cutting-edge of the outer section of the cutter passes over it than one-half the distance which the cutter is reciprocated and yet of much less width than the distance which said cutter is reciprocated the outer edge of said outer section is thereby properly protected, when in its outer reciprocation, by the outer edge of the divider. By having that part of said narrow divider G which is in the rear of the cutting part of the outer edge of said outer section of the cutter and in front of the finger-bar extended as far inward as the outer end of said section is (when in its inner reciprocation) the standing crop is prevented, by that part of said narrow divider in front of the finger-bar, from passing back of the cutting part of the outer edge of said outer section of the cutter and impeding or stopping the cutter's motion. By having the upper one of those parts of said narrow divider against which the crop is cut narrower than the lower part, (as seen in Fig. 1 of the drawings,) where greater width is required for giving the divider strength and protecting the cutting part of the outer edge of the outer section of the cutter, (when in its outer reciprocation,) less clogging matter can collect on said upper part than would were it as wide as the lower of said parts of the divider, and thereby the cutter will be caused to operate more freely and with less power applied than it could be were the upper of said parts as wide as the lower. By having that part of said narrow divider G which crosses and is confined to the finger-bar extended farther inward than those parts against which the standing crop is cut, as seen in Figs. 1 and 7 of the drawings, said divider can be secured to the finger-bar much more firm and rigidly than it can be when said part thereof which is secured to the finger-bar is no farther inward than those parts against which the crop is cut. By having a portion of said narrow divider G extended in rear of the finger-bar it can be better secured to the bar than it could be were it not so extended.

By having harvesters' cutters, and especially those for mowing, of the length of that herein described, and therewith combined a divider, a portion of which is as low as the finger-bar, both of those portions against which the crop is cut of a less width than the length of a section of said cutter, and that portion next in rear of those portions against which the crop is cut extended as far inward as the outer end of said cutter is reciprocated, the grass cut by the outer section of the cutter is cut in a very perfect manner; but it will be observed that the utility of the combination of this cutter and divider depends very much upon the parts and their connections combined with them. Therefore a track-clearer was combined therewith, so constructed as to remove the cut from the uncut grass by a revolving motion, which removes it with less power applied, leaves it more evenly spread over the ground, and less pressed into the stubble than when otherwise removed.

U is a post, which is secured to $A^2$ and supports the fulcrum-pin *v* of the lever V, which has its front end connected with the rear end of the tongue C by a link-connection, *w*, as seen in side view 2, and in rear of the post U a holding-standard, W, which has its lower end secured to $A^2$ and its upper end curved to suit the arc which the mortise *x* in the lever through which it passes moves in, and also a series of holes, *y*, in its upper end, through the desired one of which the attendant of the machine passes a pin, Z, above the lever V, so that the cutting apparatus will be free to rise and fall with the ordinary undulations of the ground when mowing, but prevented from dropping into deep furrows or ditches when drawn over them.

When the machine is used for reaping, or is being moved from place to place, the pin Z may be put through the hole *a'* in the lever V, as seen in Fig. 2 of the drawings, but need not necessarily be done so, as the weight of the front end of the frame and cutting apparatus thereto secured is always bearing the front end of the lever V down and the handle end up to the pin Z, except when the cutting apparatus is raised by passing over something in its road.

By the combination of the lever V with the frame, tongue, cutting apparatus, and two supporting-wheels of a harvesting-machine which has its cutting apparatus run on the ground at times for mowing, and rises and falls with the undulations thereof, and at other times carried above it by the bearing of the tongue in the neck-yoke or its equivalent and said two supporting-wheels without other support, the attendant of the machine raises and lowers said cutting apparatus from and to the ground by operating upon and vibrating the handle end of the lever V in the proper direction upon its fulcrum-pin *v*. This the attendant, as will be observed, can do when the machine is in operation, and therefore raise said cutting apparatus over an obstruction which would be liable to break it if not so raised, and when over the obstruction lower it down again to the ground, so as to cut the grass, &c., close to it, and by the aid of the holding device for the handle end of the lever the attendant, as will be seen by reference to Fig. 2 of the drawings, is enabled to have said end of the lever held at such various positions as will hold the cutting apparatus at the desired height for moving the machine from place to place or for reaping, and when used for reaping to change the height of said apparatus while the machine is in operation, so that it will cut the crop closer to the ground where desired and farther from it where desired without stopping the machine for so doing, as is often necessary at different sides or parts of the same field.

Wherever the words "the short cutter herein described" occur in the following claims they are to be understood as meaning a harvester's cutter which has a number of sections corresponding to the number of fingers, including the divider, which are of a length on the bar corresponding to the distance the points or centers of the fingers are from each other, and secured to a cutter-bar whose outer end terminates with the outer end of the outer end section, and is reciprocated across the shoe, fingers, and divider in straight lines, and embracing no other features than those named. Wherever the words "the narrow divider herein described" occur in the following claims they are to be understood as meaning a divider at the outer end of a harvester's finger-bar, a portion of which is as low as the finger-bar, both of those portions against which the crop is cut of a less width than the length of a section of the short cutter herein just described, and that portion next in rear of those portions against which the crop is cut extended as far inward as the outer end of said cutter is reciprocated, and embracing no other features than those named, unless such other features be specifically pointed out.

From the foregoing description and explanations I believe that any one skilled in the art will be enabled to construct and use the aforesaid invention.

What I claim under this patent as the invention of the aforesaid JOHN J. WEEKS is—

1. The combination of the short cutter herein described with the narrow divider herein described.

2. The combination of the short cutter herein described with the narrow divider herein described, and having one of those portions of it against which the crop is cut of a less width than the other.

3. The combination of the short cutter herein described with the narrow divider herein described, and having one of those portions of it against which the crop is cut of a less width than one-half the length of a section of said cutter.

4. The combination of the short cutter herein described with the narrow divider herein described, and having a portion of it extended backward under and secured to the finger-bar.

5. The combination of the short cutter herein described with the narrow divider herein described, and having one of those portions of it against which the crop is cut of a less width than the other, and a portion extended backward under and secured to the finger-bar.

6. The combination of the short cutter herein described with the narrow divider herein described, and having one of those portions of it against which the crop is cut of a less width than one-half the length of a section of said cutter, and a portion extended backward across and connected to the finger-bar.

7. The combination of the short cutter herein described with the narrow divider herein described, and having a portion of it extended in rear of the finger-bar.

8. The combination of the short cutter herein described with the narrow divider herein described, and having that portion of it which crosses and is connected to the finger-bar extended farther inward than those portions against which the crop is cut.

9. The combination or arrangement of the following parts or elements in a harvester: the short cutter herein described, the narrow divider herein described, and a track-clearer, for the purposes specified.

10. The combination or arrangement of the following parts or elements in a harvester: the short cutter herein described, the narrow divider herein described, and a revolving track-clearer, for the purposes specified.

11. The combination or arrangement of the following parts or elements in a harvester: the short cutter herein described, the narrow divider herein described, a finger-bar having in rear of its outer portion a track-clearer and the fulcrum-pin *a*, or an equivalent thereof, which will enable this cutting and clearing apparatus to rise and fall with the undulations of the ground, and cut the grass thereto.

ANDREW WHITELEY.

In presence of—

THOMAS SCRIVENER, Jr.,
R. D. O. SMITH.